(12) United States Patent
Khadhraoui et al.

(10) Patent No.: US 10,585,198 B2
(45) Date of Patent: Mar. 10, 2020

(54) NOISE ATTENUATION OF MULTICOMPONENT MICROSEISMIC DATA

(71) Applicant: WESTERNGECO LLC, Houston, TX (US)

(72) Inventors: Bassem Khadhraoui, Grabels (FR); Ali Ozbek, Cambridge (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 602 days.

(21) Appl. No.: 14/760,009

(22) PCT Filed: Jan. 9, 2014

(86) PCT No.: PCT/IB2014/058144
§ 371 (c)(1),
(2) Date: Jul. 9, 2015

(87) PCT Pub. No.: WO2014/108843
PCT Pub. Date: Jul. 17, 2014

(65) Prior Publication Data
US 2015/0338537 A1    Nov. 26, 2015

Related U.S. Application Data

(60) Provisional application No. 61/750,502, filed on Jan. 9, 2013.

(51) Int. Cl.
| | | |
|---|---|---|
| G01N 1/28 | (2006.01) | |
| G01V 1/28 | (2006.01) | |
| G01V 1/36 | (2006.01) | |
| G01V 1/50 | (2006.01) | |

(52) U.S. Cl.
CPC .............. *G01V 1/288* (2013.01); *G01V 1/364* (2013.01); *G01V 1/50* (2013.01); *G01V 2210/123* (2013.01); *G01V 2210/324* (2013.01); *G01V 2210/3246* (2013.01)

(58) Field of Classification Search
CPC ....................................................... G01V 1/288
See application file for complete search history.

(56) References Cited

U.S. PATENT DOCUMENTS

| | | |
|---|---|---|
| 4,757,480 A | 7/1988 | Gutowski |
| 4,887,243 A | 12/1989 | Pann |
| 6,101,448 A | 8/2000 | Ikelle et al. |

(Continued)

OTHER PUBLICATIONS

Bataille, K. et al., "Polarization Analysis of High-Frequency Three-Component Seismic Data", Bulletin of the Seismological Society of America, 1991, 81(2), pp. 622-642.

(Continued)

*Primary Examiner* — Yu-Hsi D Sun (57) ABSTRACT

A method for processing microseismic data, comprises: receiving the microseismic data acquired by one or more multicomponent sensors; convolving the microseismic data with an operator that is applied to all of the components of the microseismic data; and applying a multicomponent filter operator to the convolved microseismic data. The microseismic data may result from human activity or be entirely natural. The filtering preserves the polarity of the received data while improving the signal-to-noise ratio of the filtered data.

17 Claims, 4 Drawing Sheets

(56) References Cited

U.S. PATENT DOCUMENTS

| | | | |
|---|---|---|---|
| 9,594,179 B2* | 3/2017 | Norris | G01V 1/38 |
| 2008/0112263 A1* | 5/2008 | Bergery | G01V 1/28 367/50 |
| 2008/0288173 A1 | 11/2008 | Saenger | |
| 2009/0187347 A1 | 7/2009 | Saenger | |
| 2016/0274258 A1* | 9/2016 | Probert | G01V 1/364 |

OTHER PUBLICATIONS

Bose, S. et al., "An Automatic Procedure to Detect Microseismic Events Embedded in High Noise", SEG annual meeting, Houston 2009, pp. 1537-1541.
Cai, T. T., "Adaptive Wavelet Estimation: A Block Thresholding and Oracle Inequality Approach", The Annals of Statistics, 1999, 27(3), pp. 898-924.
Cai, T. T., "On Block Thresholding in Wavelet Regression: Adaptivity, Block Size and Threshold Level", Statistica Sinica, 2002, 12(4), pp. 1241-1273.
Cai, T. T. et al., "Incorporating Information on Neighbouring Coefficients into Wavelet Estimation", Sankhya: The Indian Journal of Statistics, Series B, 63(2), pp-127-148, 2001.
De Franco, R. et al., "Polarization Filter with Singular Value Decomposition", Geophysics, 2001, 66(3), pp. 932-938.
Diallo, M. S. et al., "Instantaneous Polarization Attributes Based on an Adaptive Approximate Covariance Method", Geophysics, 2006, 71(5), pp. V99-V104.
Donoho, D. L., "De-noising by Soft-Thresholding", IEEE Transactions on Information Theory, 1995, 41(3), pp. 613-627.
Donoho, D. L. et al., "Idea of Spatial Adaptation Via Wavelet Shrinkage", Biometrika, 1994, 81(3), pp. 425-455.
Drew, J. E. et al., "Automated Microseismic Event Detection and Location by Continuous Spatial Mapping", Society of Petroleum Engineers 2005, SPE 95513, 7 pages.
Du, Z. et al., "Noise Reduction for Broad-Band Three Component Seismograms Using Data-Adaptive Polarization Filters", Geophysical Journal International, 2000, 141, pp. 820-828.
Ephraim, Y. et al., "Speech Enhancement Using a Minimum Mean-Square Error Short-Time Spectral Amplitude Estimator", IEEE Transactions on Acoustics, Speech. and Signal Processing, 1984 ASSP-32(6), pp. 1109-1121.
Esmersoy, C., "Polarization analysis rotation and velocity estimation in three-component VSP", Handbook of Geophysical Exploration, 14B, 1984, pp. 236-255.
Ghael, S. et al., "Improved Wavelet Denoising Via Empirical Wiener Filtering," Proceedings of SPI, Mathematical Imaging, 1997, pp. 1-11.
Hall, P. et al., "Block Threshold Rules for Curve Estimation Using Kernel and Wavelet Methods", The Annals of Statistics, 1998, 26(3) pp. 922-942.
Hall, P. et al., "On the Minimax Optimality of Block Threshold Wavelet Estimators", Statistica Sinica, 1999, 9, pp. 33-49.
Jurkevicz, A., "Polarization Analysis of the Three-Component Array Data", Bulletin of the Seismological Society of America, 1988, 78(5), pp. 1725-1743.
Kendall, R. et al, "An SVD Polarization Filter for Ground Roll Attenuation on Multicomponent Data", Seg Technical Program Expanded Abstracts, 2005, pp. 928-931.
Khadhraoui, B. et al., "Real-Time Detection and Localization of Microseismic Events", SEG annual meeting Denver 2010, pp. 2146-2150.
Kragh, E. et al., "Ground Roll Polarization", First Break, 1995, 13(9), pp. 369-378.
Morozov, I. et al., "Instantaneous Polarization Attributes and Directional Filtering", Geophysics, 1996, 61(2), pp. 872-881.
Muti, D. et al., "Multidimensional Filtering Based on a Tensor Approach", Signal Processing, 2005, 85(12), pp. 2338-2353.
Nguyen, D. et al., "Polarization Filter for Multicomponent Seismic Data", BSSA 78, 93-101.
Park, J. et al., "Frequency Dependent Polarization Analysis of High-Frequency Seismograms", Journal of Geophysical Research, 1987, 92(B12), pp. 12,664-12,674.
Pinnegar, C., "Polarization Analysis and Polarization Filtering of Three-Component Signals with the Time-Frequency S Transform", Geophysical Journal International, 2006, 165(2), pp. 596-606.
Renaud, O. et al., "Wavelet-Based Combined Signal and Filtering and Prediction", IEEE Trasactions on Systems, Man, and Cybernetics— Part B: Cybernetics, 2005, 35(6), pp. 1241-1251.
Samson, J. et al.,"Data-Adaptive Polarization Filters for Multichannel Geophysical Data", Geophysics, 1981, 46(10), pp. 1423-1431.
Schimmel, M. et al., "The Use of Instantaneous Polarization Attributes for Seismic Signal Detection and Image Enhancement", Geophysical Journal International, 2003, 155(2), pp. 653-668.
Stein, C. et al., "Estimation of the Mean of a Multivariate Normal Distribution", The Annals of Statistics, 1981, 9(6), pp. 1135-1151.
Vidale, J., "Complex Polarization Analysis of Particle Motion", Bulletin of the Seismological Society of America, 1986, 76(5), pp. 1393-1405. 111.
Yu, G. et al., "Audio Denoising by Time-Frequency Block-Thresholding", IEEE Transactions on Signal Processing, 2008, 56(5), pp. 1830-1839.
Preliminary Report of Patentability of International Patent Application No. PCT/IB2014/058144, dated Jul. 23, 2015, 8 pages.
Search Report and Written Opinion of International Patent Application No. PCT/IB2014/058144, dated Apr. 18, 2014, 11 pages.
First Office Action of Chinese Patent Application No. 201480011694.7, dated Mar. 7, 2017, 3 pages
Search Report of European Patent Application No. 14738312.9, dated Mar. 29, 2016, 3 pages.
Examination Report of European Patent Application No. 14738312.9, dated Apr. 14, 2016, 7 pages.

* cited by examiner

NOISE ATTENUATION OF MULTICOMPONENT MICROSEISMIC DATA

BACKGROUND

Microseismic measurements can be characterized as a variant of seismics. In conventional seismic explorations a seismic source placed at a predetermined location, such as one or more airguns, vibrators or explosives, is activated and generates sufficient acoustic energy to cause acoustic waves to travel through the Earth. Reflected or refracted parts of this energy are then recorded by seismic receivers such as hydrophones and geophones.

In passive seismic or microseismic monitoring there is no actively controlled and triggered seismic source at a known location. The seismic energy is generated through so-called microseismic events caused by subterranean shifts and changes occurring within the subterranean formation and which at least partially give rise to acoustic waves which in turn can be recorded using suitable receivers. Microseismic events may have a man-made cause, such as hydraulic fracturing or may have an entirely natural origin. Although the microseismic events may be a consequence of human activity disturbing the subterranean rock, they occur without any active seismic source device which is operated to emit an acoustic signal. Microseismics may be used in the hydrocarbon industry to investigate petrochemical properties of the subsurface, monitor production of hydrocarbons from a reservoir, monitor fracturing/stimulation of the subsurface and/or the like. In a microseismic survey, passive seismic data is acquired and then processed to determine the properties of a subterranean section of the earth.

In a microseismic survey, a plurality of seismic sensors are deployed at positions proximate to the Earth's surface, in deep wells and/or in shallow wells. In multicomponent microseismic surveys, "three component" sensors are used to acquire the microseismic data. Three component sensors include three or more, typically mutually orthogonally oriented particle motion sensing elements. The sensing elements may be geophones, but may also be accelerometers or any other sensing device known in the art that is responsive to velocity, acceleration or motion of the particles of the Earth proximate the sensor. The seismic sensors generate electrical and/or optical signals in response to the detected particle motion or acceleration along each of the three directionally sensitive components. The acquired signals may be used to create a time-indexed recording of the signals from each sensor and this microseismic data may be processed to determine properties of a subsection of the Earth, fracturing operation in the subsection of the Earth, properties of a reservoir producing hydrocarbons and/or the like.

Noise filtering is important in microseismic data processing because passive seismic interpretation is very sensitive to data quality. In microseismics, the uncertainty of the estimated microseismic event locations is strongly dependent on the data quality. As such, the uncertainty in the location of the microseismic events can be reduced by improving the signal-to-noise ratio of the processed seismic data.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. The subject matter now disclosed provides systems and methods for attenuating noise in multicomponent microseismic data. Methods and systems disclosed here seek to improve the signal-to-noise ratio of microseismic data. The methods and systems may do this whilst preserving polarization information.

An exemplary embodiment of the presently disclosed subject matter provides a method for processing microseismic data, comprising: receiving the seismic data, wherein the seismic data was acquired by one or more multicomponent sensors; convolving the seismic data with an operator that is applied to all of the components of the seismic data; and applying a multicomponent filter operator to the convolved seismic data.

A further exemplary embodiment of the presently disclosed subject matter provides a method for processing microseismic data, comprising: receiving the microseismic data, wherein the microseismic data was acquired by one or more multicomponent sensors; convolving the microseismic data with an operator that is applied to all three-components of the microseismic data; applying a multicomponent filter operator to the convolved microseismic data; and processing the filtered microseismic data to determine at least one of a location of one or more microseism that generated, at least in part, the microseismic data and properties of a subterranean section of the Earth.

A method or system may include receiving the microseismic data at sensors. The sensors may receive acoustic signals on three axes which may be orthogonal axes. Processing of data may be carried out by means of a programmed computer and a method or system may include some or all of placing the processed data in a storage medium, output of the filtered data to a visual display, transmitting processed data to means for processing it further (for instance further processing the filtered data to determine location of one or more microseism that generated, at least in part, the microseismic data and/or determine properties of a subterranean section of the Earth0 and output to a display after further processing.

DETAILED DESCRIPTION

The ensuing description of embodiment(s) of the concepts disclosed is not intended to limit the scope, applicability or configuration of the invention as claimed. Some embodiments may be described below without all the specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Some embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure and may start or end at any step or block. A process may correspond to a method, a function, a procedure, a subroutine, a subprogram, etc. When a process corresponds to a function, its termination corresponds to a return of the function to the calling function or the main function.

In an embodiment, a filter for use with microseismic data is provided that enhances the signal-to-noise ratio of the data while preserving polarization information. In some aspects, a combination of two or three filters/filtering steps may be used is used to enhance the signal-to-noise ratio of the data while preserving polarization information. For example in some aspects, a polarization filter may be applied to the microseismic data to pre-condition the data. In some embodiments, an adaptive multicomponent block-thresholding filter may be applied to the microseismic data. And in some embodiments, results obtained from the application of the adaptive multicomponent block-thresholding filter may be used to build a classic optimal Wiener filter, which in turn may be applied to the microseismic data.

One aspect of the present subject matter provides a method for processing microseismic data, comprising: receiving the seismic data, wherein the seismic data was acquired by one or more multicomponent sensors; convolving the seismic data with an operator that is applied to all of the components of the seismic data; and applying a multicomponent filter operator to the convolved seismic data.

Multicomponent sensors typically acquire data with 3 components which are orthogonal axes of displacement (generally referred to as the x-, y- and z-axes). However, the method of this aspect has more general application and can be applied where data is acquired in alternative sensors with different numbers of components.

In a typical deployment, the sensors will be multicomponent geophones which can be deployed either at surface level or downhole in a monitoring well or a set of monitoring wells. When deployed downhole, the multicomponent geophones are commonly gathered into a Vertical Seismic Profiling (VSP) tool.

A collection of seismic sensors may form a receiver-network which records acoustic data continuously, for instance at a sampling rate of around 1 millisecond (for instance, an interval between samples which is at least a tenth of a millisecond but no more than 10 milliseconds).

When a microseismic event occurs, a variation of amplitude and/or frequency will be present in the recorded data. The microseismic event can be detected from this variation by measuring the arrival times and polarization of the primary and secondary intercepted waves. These measurements can then be inverted to determine the microseismic event location and origin time and/or properties of a subterranean section of the Earth.

The method of this aspect may include the further step of processing the filtered microseismic data to determine a location of a microseismic event that generated, at least in part, the seismic data. Alternatively or additionally the method of this aspect may include the further step of processing the filtered seismic data to determine one or more properties of a subterranean section of the Earth.

Preferably the operator that is convolved with the seismic data preserves the polarization of the data. The polarization of the data is an important factor in the detection and locating of the microseismic events and so needs to be retained in the filtered data to improve the detection and location prospects.

In one embodiment, the operator that is convolved with the microseismic data uses attenuation maps in the time-frequency domain for each of the components of the seismic data.

A particular operator that may be used is, for a given point in the time-frequency domain, the maximum gain across all the gains of all of the components at said point.

The method may further comprise partitioning the time-frequency domain for each component to derive said attenuation maps using an adaptive block-thresholding algorithm. The use of time-frequency blocks improves the robustness of the method to outliers which are isolated energy spikes. Adaptive block-thresholding partitions the time-frequency domain into non-identical blocks of variable size. Such partitioning may be based on the minimization of the Stein Unbiased Risk Estimate (SURE) that directly estimates the risk or quadratic error between the true signal and the filtered one.

The choice of threshold may be based on statistical hypothesis testing, and in particular may be derived from the mean noise energy In a particularly preferred embodiment the adaptive block-thresholding algorithm returns a partition $$(B_{x_i})_{i \in I_x}$$

of the time-frequency domain which comprises Ix blocks $B_{x_i}$ of different sizes $B_{x_i}^{\#}$ and the partition filter gain, $a_{x_i}$, for a given block $B_{x_i}$ of size $B_{x_i}^{\#}$ is given by:

$$a_{x_i} = \left(1 - \lambda_{x_i}\left(\frac{\overline{\sigma_{n_{x_i}}^2}}{\frac{1}{B_{x_i}^{\#}}\sum_{(k,l) \in B_{x_i}}|\langle x_n, g_{k,l}\rangle|^2}\right)^{\beta_1}\right)_+^{\beta_2}, \forall i \in I_x,$$

where $$\overline{\sigma_{n_{x_i}}^2}$$

represents the variance of the noise on the $x_n$ component in the block $B_{x_i}$, $g_{k,l}$ represents a time-frequency wavelet function, the operator $(\ )_+$ represents the maximum between zero and the value to which the operator is applied, k, l∈Time×Freq, $\beta_1 \geq 0$, $\beta_2 \geq 0$ and $\lambda$ is a threshold for separating noise and signal coefficients.

The step of applying the multicomponent filter operator may derive the filtered signal as:

$$\hat{x}_{BT3C}[m] = \frac{1}{A}\sum_{k,l} a_{3C}[k, l]\langle x_n, g_{k,l}\rangle g_{k,l}[m], m = 1, 2, \ldots, N_{samples}$$

$$\hat{y}_{BT3C}[m] = \frac{1}{A}\sum_{k,l} a_{3C}[k, l]\langle y_n, g_{k,l}\rangle g_{k,l}[m], m = 1, 2, \ldots, N_{samples}$$

$$\hat{z}_{BT3C}[m] = \frac{1}{A}\sum_{k,l} a_{3C}[k, l]\langle z_n, g_{k,l}\rangle g_{k,l}[m], m = 1, 2, \ldots, N_{samples}$$

where $a_{3C}$ [k,l] is the operator that is convolved with the data, $g_{k,l}$ represents a time-frequency wavelet function and A is a user-controlled parameter greater than or equal to 1 and $N_{samples}$ is the number of time samples in the seismic data. The wavelet functions are atoms and the dominant atom coefficients are associated with the signal whilst the remaining coefficients are associated with the noise.

Preferably the method includes the initial step of applying a polarization filter to the received seismic data prior to convolving said data. Applying a polarization filter (for example one such as that suggested by De Franco & Musacchio in Geophysics. 66(3), 932-938, 2001) can attenuate the noise in the data whilst preserving polarization. However, this pre-processing does not remove all of the noise and in order to attenuate the noise remaining after polarization filtering, the multicomponent filtering of the present aspect is subsequently applied. However, a combination of the two filters can improve the signal-to-noise ratio and the P-wave azimuth error in the filtered data more than each filter applied independently.

In some embodiments, the method may further comprise using the filtered seismic data to generate a Wiener filter. A Wiener filter will typically not only smooth out the final output, but it may also add a small improvement to the signal-to-noise ratio.

The method of this aspect may include some, all or none of the above described preferred or optional features in any combination.

A second aspect of the present subject matter provides a method for processing microseismic data, comprising: receiving the microseismic data, wherein the microseismic data was acquired by one or more multicomponent sensors; convolving the microseismic data with an operator that is applied to all three-components of the microseismic data; applying a multicomponent filter operator to the convolved microseismic data; and processing the filtered microseismic data to determine at least one of a location of one or more microseism that generated, at least in part, the microseismic data and properties of a subterranean section of the Earth.

In a typical deployment, the sensors will be multicomponent geophones which can be deployed either at surface level or downhole in a set of monitoring wells. When deployed downhole, the multicomponent geophones are commonly gathered into a Vertical Seismic Profiling (VSP) tool.

A collection of seismic sensors may form a receiver-network which records acoustic data continuously, typically at a sampling rate of around 1 millisecond.

When a seismic event occurs, a variation of amplitude and/or frequency will be present in the recorded data. The seismic event can be detected from this variation by measuring the arrival times and polarization of the primary and secondary intercepted waves. These measurements can then be inverted to predict the seismic event location and origin time and/or properties of a subterranean section of the Earth.

The method preferably further comprises applying a polarization filter to the received microseismic data. Applying a polarization filter (for example one such as that suggested by De Franco & Musacchio in Geophysics. 66(3), 932-938, 2001) can attenuate the noise in the data whilst preserving polarization. However, this pre-processing does not remove all of the noise and in order to attenuate the noise remaining after polarization filtering, the multicomponent filtering of the present aspect is subsequently applied. However, a combination of the two filters can improve the signal-to-noise ratio and the P-wave azimuth error in the filtered data.

The method may further comprise using the filtered microseismic data to generate a Wiener filter. A Wiener filter will typically not only smooth out the final output, but it may also add a small improvement to the signal-to-noise ratio.

The multicomponent filter operator may comprise an adaptive block-thresholding (BT) algorithm that is applied to the three components of the microseismic data. The adaptive block-thresholding algorithm may return a partition of the time-frequency domain and an associated time-frequency filter gain map of attenuation coefficients for each of the components in the microseismic data.

The threshold for the adaptive block-thresholding (BT) algorithm may be determined using a noise variance. In some embodiments the choice of threshold may be based on statistical hypothesis testing of the mean noise energy, for example based on the number of degrees of freedom in the partitioning.

In some embodiments of the present aspect the multicomponent filter may be designed using $a_x$, $a_y$ and $a_z$ attenuation maps, such that an attenuation map is produced for each component and the filtering is carried out across said attenuation maps in such a way as to preserve polarization information.

The multicomponent filter operator may also be applied in the time frequency domain.

In one embodiment, microseismic data acquired by multicomponent sensors is received; the multicomponent microseismic data is received as signals from the multicomponent sensors. The received multicomponent microseismic data may be filtered using a polarization filter. In embodiments, the received multicomponent microseismic data, which may have had a polarization filter applied, is convolved with an operator $a_{sc}$, which is applied to all three-component signals of the data. A multicomponent filter operator may be designed using $a_x$, $a_y$ and $a_z$ attenuation maps for the received multicomponent microseismic data and the a multicomponent filter operator is applied to the convolved data. In some aspects, filtered signal produced by application of the multicomponent filter operator to the microseismic data may be used to design a Wiener filter, that may then itself be applied to the filtered microseismic data to provide further filtering. In embodiments of the present invention, the filtered multicomponent microseismic data may be processed to determine properties of a subterranean section of the Earth, produce an image of an interior section of the Earth, top monitor properties of a hydrocarbon reservoir and/or to manage/monitor a fracturing/stimulation process. In some aspects, locations of microseisms may be determined by processing the multicomponent microseismic data that has been filtered in accordance with the methods disclosed herein.

As described above, embodiments of the present subject matter provide a compound filter that is suitable for multicomponent seismic data. The objective of the new filter is to enhance the data signal-to-noise ratio while preserving polarisation information. In some embodiments, a single filter may be used to achieve this and in some embodiments a combination of two or three filters may used to achieve this objective. The first of a plurality of filters may be a polarisation filter which may be applied to pre-condition the multicomponent microseismic data. This may be followed by the application of the second filter, which is an adaptive multicomponent block-thresholding technique. In embodiments, this filter preserves polarization of the data, while reducing the noise in each of the recorded components. Because it operates in the time-frequency domain, this filter can benefit from the potential separation between signal and noise that can occur in such a domain. The results obtained from the application of this method may in some aspects be used to build the third filter, an optimal Wiener filter. In embodiments, tested using synthetic data, the signal-to-noise ratio improvement was measured in the range of 8-12 dB, while the polarization of the data was preserved.

The method of this aspect may include some, all or none of the above described preferred or optional features in any combination.

The present subject matter also includes a computer program for carrying out the method of either of the above aspects, a computer-readable data carrier having such a computer program and a computer system which is programmed to perform the method of either of the above aspects.

In microseismic data processing a wavelet transform filter may be used to reduce microseismic noise. The time-frequency domain can offer potential separation between signal and noise. In this domain, a square-summable signal can be written as a linear combination of atoms, wavelet functions $g_{k,l}$ where k and l represent the time and scale/frequency indices. These atoms may be obtained by scaling and shifting a mother wavelet function g. Given a redundancy real factor A greater or equal to one, such a signal s can be written as $$s[m] = \frac{1}{A}\sum_{k,l} \langle s, g_{k,l} \rangle g_{k,l}[m] = 1, 2, \ldots, N_{samples} \quad (1)$$

where $N_{samples}$ is the number of time samples in the considered signal.

The parameter A is controlled by the user. If A is set to one, the atoms form an orthogonal decomposition basis. On the other hand, if A is set to a number larger than one, the information available is redundant, which can be helpful in cases that require noise reduction. The set of atoms available is, in effect, the union of A orthogonal bases.

In the type of filtering that is based on a wavelet transform, the dominant atom coefficients are associated with the signal and the remaining coefficients are associated with noise. The challenge consists, therefore, in finding the satisfactory threshold "λ" for the separation between noise and signal coefficients.

In order to remove noise, a first approach consists of replacing the wavelet coefficients, which are lower than λ, with zeros. This approach is called "hard-thresholding." An alternative to this approach is referred to as soft-thresholding operator. In the time-frequency domain, Weiner and soft-thresholding operators for a filter may be described as specific cases of the Generalized Power Subtraction operator:

$$a[k,l] = \left(1 - \lambda \left(\frac{\sigma_n^2[k,l]}{\langle s_n, g_{k,l}\rangle^2}\right)^{\beta_1}\right)_+^{\beta_2}, \quad (2)$$

$$\forall k, l \in \text{Time} \times \text{Freq}, \beta_1 \geq 0, \beta_2 \geq 0$$

where:

the operator $(\ )_+$ represents the maximum between zero and the value to which the operator is applied. Hence, for x real, $(x)_+ = \max(x,0)$;

$\sigma_n^2[k,l]$ is the noise variance; and $s_n$ is the noisy signal.

Note that when:

$\beta_1 = 0.5$ and $\beta_2 = 1$, the operator is the soft-thresholding operator.

$\lambda = 1$ and $\beta_1 = \beta_2 = 1$ then the operator is the Wiener operator.

Figure 1:
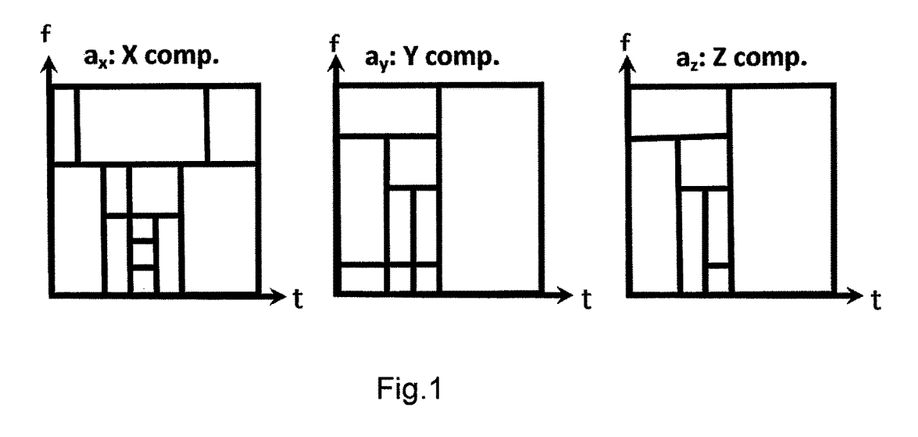
FIG. 1 shows single component time-frequency domain partitioning for the x, y and z components.

By way of example and without loss of generality, it may be assumed that the microseismic data to be processed is multicomponent microseismic data acquired from a three-component (3C) geophone. The noisy 3C components may be represented by $(x_n, y_n, z_n)$. When applied to the $x_n$ noisy signal recorded by the x component, an adaptive block-thresholding (BT) algorithm returns a partition $$(B_{x_i})_{i \in I_x}$$

of the time-frequency domain. This partition is made up of Ix blocks $B_{x_i}$ of different sizes $B_{x_i}^{\#}$. FIG. 1 illustrates the partitioning of the time-frequency domain for, from left to right, the x, y and z components.

For a given block $B_{x_i}$, the filter gain, $a_{x_i}$, is constant and given by $$a_{x_i} = \left(1 - \lambda_{x_i}\left(\frac{\overline{\sigma_{n_{x_i}}^2}}{\frac{1}{B_{x_i}^{\#}}\sum_{(k,l)\in B_{x_i}}|\langle x_n, g_{k,l}\rangle|^2}\right)^{\beta_1}\right)_+^{\beta_2}, \forall i \in I_x, \quad (3)$$

where:

$$\overline{\sigma_{n_{x_i}}^2}$$

represents the variance or the noise on the $x_n$ component in the block $B_{x_i}$. (The noise variance $\sigma_{n_x}^2$ of the noisy record $x_n$ is assumed to be known—the variance can, for example, be estimated either from records preceding or during the stimulation process); and $g_{k,l}$ represents a time-frequency wavelet function.

Likewise, when applied to the $y_n$ (resp. $z_n$) noisy component, the adaptive block-thresholding algorithm returns a partition $$(B_{y_i})_{i \in I_y}\left(resp.(B_{z_i})_{i \in I_z}\right)$$

and an associated time-frequency filter gain map $a_y$ (resp. $a_z$) of the attenuation coefficients (cf. equations (4) and (5)).

$$a_{y_i} = \left(1 - \lambda_{y_i} \left(\frac{\overline{\sigma_{n_{y_l}}^2}}{\frac{1}{B_{y_i}^\#} \sum_{(k,l) \in B_{y_i}} |\langle y_n, g_{k,l} \rangle|^2}\right)^{\beta_1}\right)_+^{\beta_2}, \forall i \in I_y, \quad (4)$$

$$a_{z_i} = \left(1 - \lambda_{z_i} \left(\frac{\overline{\sigma_{n_{z_l}}^2}}{\frac{1}{B_{z_i}^\#} \sum_{(k,l) \in B_{z_i}} |\langle z_n, g_{k,l} \rangle|^2}\right)^{\beta_1}\right)_+^{\beta_2}, \forall i \in I_z. \quad (5)$$

Figure 2:
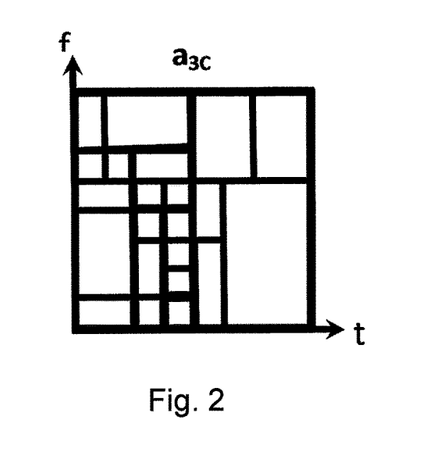
FIG. 2 shows common partition of the time-frequency domain for the three components (x, y and z)

Note that if each coefficient map is applied to its associated data, this will act as a single component filter. As a result, the polarization information associated with the multicomponent microseismic data will not be preserved. For that reason an embodiment of the present subject matter provides a multicomponent filter that preserves the polarization. The multicomponent microseismic data (the 3C data in the example) may be convolved with an operator $a_{3C}$, which is applied to all three-component signals. FIG. 2 illustrates the partition of the time-frequency domain for the common operator $a_{3C}$ derived from the three components shown in FIG. 1.

In an embodiment, in order to design the multicomponent filter operator, the $a_x$, $a_y$ and $a_z$ attenuation maps may be used in a non-aggressive approach and $a_{3C}$ may be defined as:

$$a_{3C}[k,l] = \max(a_x[k,l], a_y[k,l], a_z[k,l]), \quad (6)$$

where k and l represent respectively the time and frequency indices.

It may be verified that if two of the three-component signals are dead-traces (i.e. the recorded amplitudes equal zero), the associated attenuation maps will also be equal to zero. Therefore, $a_{3C}$ is equal to the attenuation map of the non-dead trace. The multicomponent filter output, in accordance with an embodiment of the present disclosure, is therefore identical to the signal obtained using a single component filter when it is applied to the non-dead trace. Hence, the multicomponent filter of embodiments of the present disclosure preserves polarization of the microseismic data.

In embodiments of the present disclosure, the data filtered by the multicomponent, 3C adaptive block-thresholding method (BT3C) is given by equations (7), (8) and (9).

$$\hat{x}_{BT3C}[m] = \frac{1}{A} \sum_{k,l} a_{3C}[k,l] \langle x_n, g_{k,l} \rangle g_{k,l}[m], \quad (7)$$
$$m = 1, 2, \ldots, N_{samples},$$

$$\hat{y}_{BT3C}[m] = \frac{1}{A} \sum_{k,l} a_{3C}[k,l] \langle y_n, g_{k,l} \rangle g_{k,l}[m], \quad (8)$$
$$m = 1, 2, \ldots, N_{samples},$$

$$\hat{z}_{BT3C}[m] = \frac{1}{A} \sum_{k,l} a_{3C}[k,l] \langle z_n, g_{k,l} \rangle g_{k,l}[m], \quad (9)$$
$$m = 1, 2, \ldots, N_{samples},$$

In embodiments of the present disclosure, the 3C adaptive block-thresholding approach provides a filtered signal, which may be used to design a Wiener filter. In such aspects of the present disclosure, the Wiener filter will not only smooth out the final output, but it will also add a small enhancement to the Signal-to-Noise Ratio (SNR).

The time-frequency gains of the Wiener filter thus designed using the filtered signal are given by equations (10), (11) and (12). For practical reasons, the filter provided by the combination of the adaptive multicomponent block-thresholding (BT3C) and the Wiener filter (W), in accordance with embodiments of the present disclosure, will be referred to as BT3CW. In some aspects of the present disclosure, if a polarization filter (P) is applied to the 3C microseismic data before the application of the BT3CW filtering method, the overall method will be referred to as PBT3CW.

$$a_{x_{Wiener}}[k,l] = \frac{|\hat{X}_{BT3C}[k,l]|^2}{|\hat{X}_{BT3C}[k,l]|^2 + \sigma_{n_x}^2} \quad (10)$$

$$a_{y_{Wiener}}[k,l] = \frac{|\hat{Y}_{BT3C}[k,l]|^2}{|\hat{Y}_{BT3C}[k,l]|^2 + \sigma_{n_y}^2} \quad (11)$$

$$a_{z_{Wiener}}[k,l] = \frac{|\hat{Z}_{BT3C}[k,l]|^2}{|\hat{Z}_{BT3C}[k,l]|^2 + \sigma_{n_z}^2} \quad (12)$$

where:
$\hat{X}_{BT3C}[k,l] = \langle \hat{x}_{BT3C}, g_{k,l} \rangle$;
$\hat{Y}_{BT3C}[k,l] = \langle \hat{y}_{BT3C}, g_{k,l} \rangle$; and
$\hat{Z}_{BT3C}[k,l] = \langle \hat{z}_{BT3C}, g_{k,l} \rangle$.

Hence, the final multicomponent filtered signal is given by:

$$\hat{x}[m] = \frac{1}{A} \sum_{k,l} a_{x_{Wiener}}[k,l] \langle x_n, g_{k,l} \rangle g_{k,l}[m], \quad (13)$$
$$m = 1, 2, \ldots, N_{samples}$$

$$\hat{y}[m] = \frac{1}{A} \sum_{k,l} a_{y_{Wiener}}[k,l] \langle y_n, g_{k,l} \rangle g_{k,l}[m], \quad (14)$$
$$m = 1, 2, \ldots, N_{samples}$$

$$\hat{z}[m] = \frac{1}{A} \sum_{k,l} a_{z_{Wiener}}[k,l] \langle z_n, g_{k,l} \rangle g_{k,l}[m], \quad (15)$$
$$m = 1, 2, \ldots, N_{samples}$$

Figure 3:
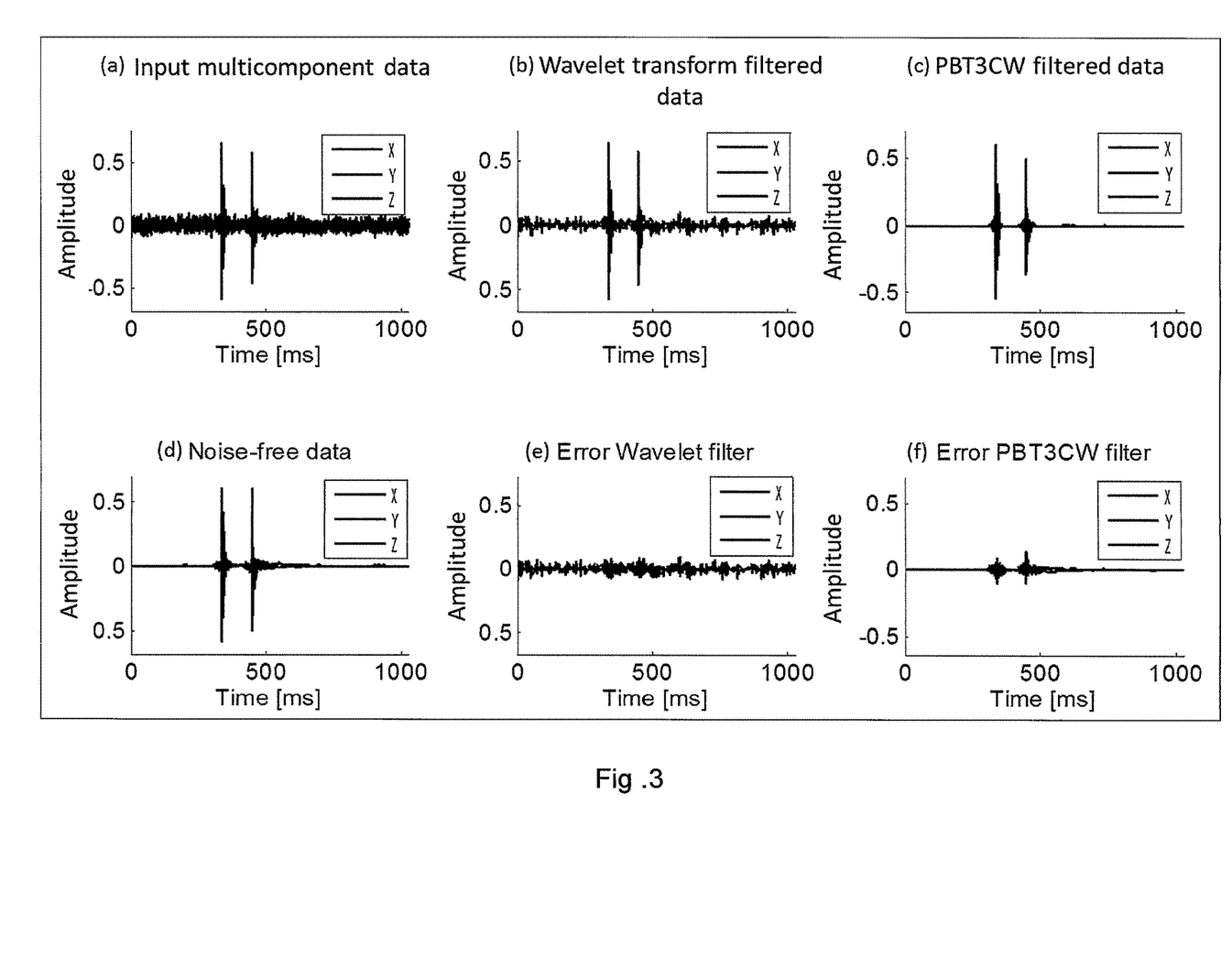
FIG. 3 shows an example of a filtering result for a synthetic signal contaminated with real noise, the sub-figures showing respectively: (a) input multicomponent data, (b) wavelet transform filtered data, (c) filtered data which has been filtered as disclosed herein, (d) noise-free data, (e) error in wavelet transform filtered data, (f) error in filtered data which has been filtered as disclosed herein.

The filtering process in accordance with embodiments of the present disclosure was tested using a synthetic microseismic signal to which different levels of real noise were added. This is illustrated by FIG. 3 These traces in FIG. 3 include the data from the X, Y and Z components overlaid on each other. These components cannot be distinguished in the Figure as shown, but the effects of the filters are evident. The noise-free synthetic signal is shown in the bottom left panel. The top left panel represents the noise contaminated signal, referred to as input data. The top and bottom middle panels represent respectively the wavelet transform filtered output and the associated filtering error. The top and bottom right panels represent the PBT3CW filtered output and its associated filtering error. In this example, SNR of the input data was 5.7 dB. This is improved to 10.5 dB using the wavelet transform filter and 17.9 dB with the PBT3CW filter. The P-wave azimuth error was less than 0.5 for degrees both filters, indicating that polarisation is preserved.

Figure 4:
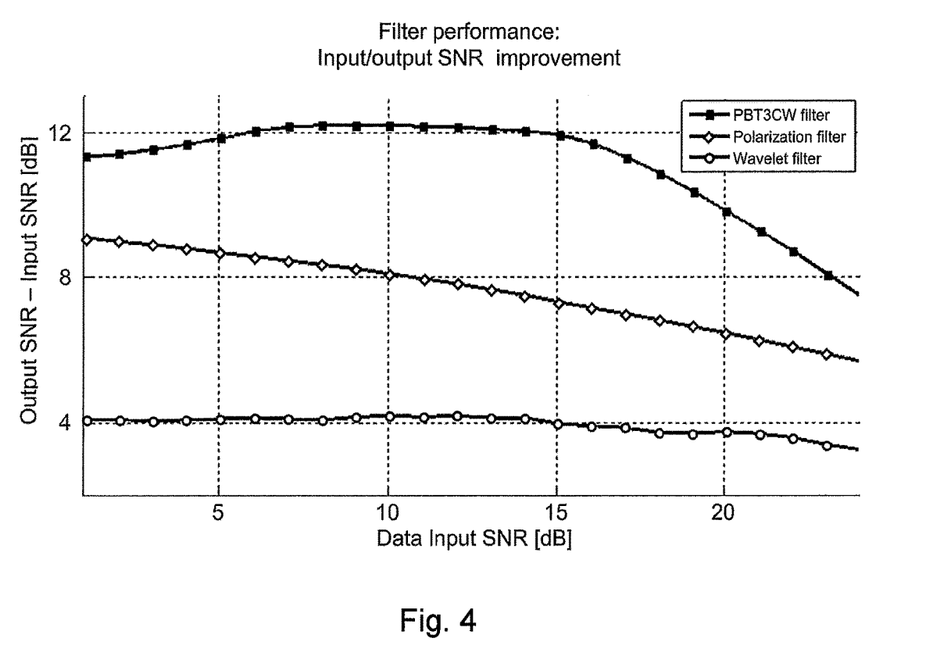
FIG. 4 shows a comparison of the performance of three filters, being, from top to bottom a filter as disclosed herein, a polarisation filter, and a wavelet transform filter, each plotted as SNR filtering improvement vs. input SNR for a synthetic microseismic event contaminated by different levels of real noise.

FIG. 4 shows the SNR improvement of three filters (i.e. PBT3CW filter according to an embodiment of the present disclosure, wavelet transform filter and polarisation filter) as a function of the input noise level. The comparison is made for a range of input SNRs of 25 dB. As shown by the top curve in this plot, the PBT3CW filter offers a signal-to-noise ratio improvement in the range of 8-12 dB whereas the wavelet transform filter shown by the bottom curve improves the data by approximately 4-5 dB for the same input noise range. As shown by the middle curve in this Figure, the polarisation filter offers a signal-to-noise ratio improvement of 6-9 dB.

Figure 5:
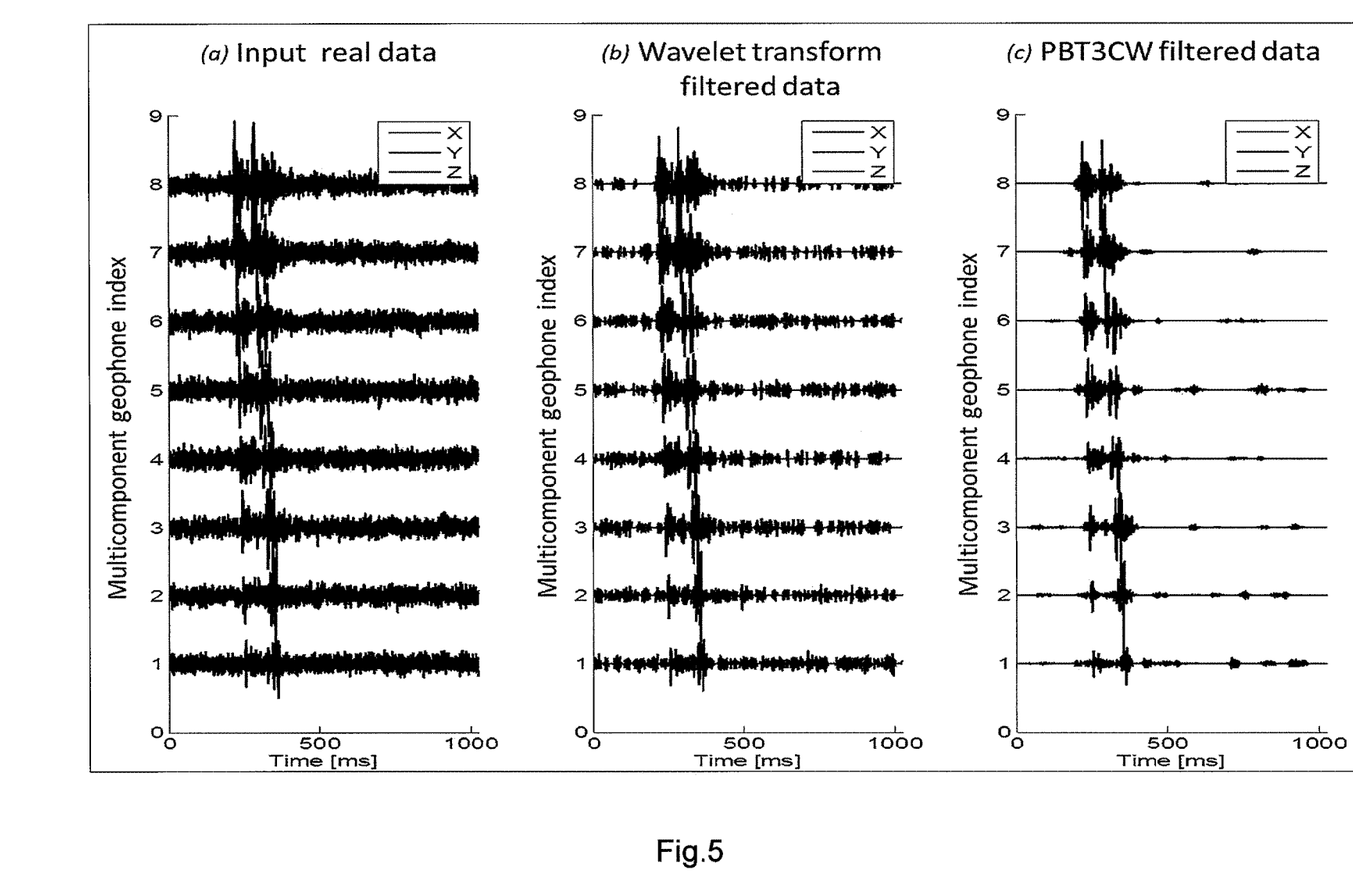
FIG. 5 shows the waveforms obtained when applying a wavelet transform filter and a filter as disclosed herein to a real microseismic event.

FIG. 5 displays the waveforms obtained when applying a wavelet transform filter and PBT3CW to a real microseismic event. The microseismic event was recorded by eight downhole multicomponent geophones. The PBT3CW filter clearly provides output data with higher SNR. In this Figure, as in FIG. 3, these traces include the data from the X, Y and Z components overlaid on each other. These components cannot be distinguished in the Figure as shown, but the effect of the filter can clearly be seen.

Some embodiments of the present disclosure provide a new compound filter (PBT3CW) for multicomponent microseismic data. The filter may preserve the information required for detecting and locating seismic events/microseisms. The PBT3CW is based on pre-conditioning the noisy data with a polarisation filter. An adaptive multicomponent block-thresholding (BT3C) technique is used to extract the signal of interest from the pre-conditioned data. BT3C may require the noise variance as an input. The signal provided by BT3C may be used to design the input for a Wiener filter. PBT3CW may be used in the time-frequency domain where it is very robust to outliers because of its adaptive block approach.

The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Embodiments of the subject matter above may be implemented by hardware, software, firmware, middleware, microcode, hardware description languages, or any combination thereof. When implemented in software, firmware, middleware or microcode, the program code or code segments to perform the necessary tasks may be stored in a machine-readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It will be appreciated that the example embodiments described in detail above can be modified and varied within the scope of the concepts which they exemplify. Features referred to above or shown in individual embodiments above may be used together in any combination as well as those which have been shown and described specifically. It is to be clearly understood that this description is made only by way of example and not as limitation on the scope of the invention as claimed.

What is claimed is:

1. A method for processing microseismic data, comprising:
receiving the microseismic data having more than one component, wherein the microseismic data are acquired by a plurality of multicomponent sensors and recorded by a receiver network;
convolving the microseismic data with a multicomponent filter operator that is applied to all of the components of the microseismic data, wherein the signal-to-noise ratio in the microseismic data is enhanced by applying the multicomponent filter operator to the microseismic data; and
processing filtered microseismic data to determine at least one of a location of a microseismic event and a property of a subterranean section.

2. The method of claim 1, wherein the operator that is convolved with the microseismic data preserves the polarization of the data.

3. The method of claim 2, wherein the operator that is convolved with the microseismic data uses attenuation maps in the time-frequency domain for each of the components of the microseismic data.

4. The method of claim 2, wherein the operator that is convolved with the microseismic data uses attenuation maps in the time-frequency domain for each of the components of the microseismic data.

5. The method of claim 3, further comprising partitioning the time-frequency domain for each component to derive said attenuation maps using an adaptive block-thresholding algorithm.

6. The method of claim 5, wherein the adaptive block-thresholding algorithm returns a partition $$(B_{x_i})_{i \in I_x}$$

of the time-frequency domain which comprises Ix blocks $B_{x_i}$ of different sizes $B_{x_i}^{\#}$ and the partition filter gain, $a_{x_i}$, for a given block $B_{x_i}$ of size $B_{x_i}^{\#}$ is given by:

$$a_{x_i} = \left(1 - \lambda_{x_i}\left(\frac{\overline{\sigma_{n_{x_i}}^2}}{\frac{1}{B_{x_i}^{\#}}\sum_{(k,l) \in B_{x_i}}|\langle x_n, g_{k,l}\rangle|}\right)^{\beta_1}\right)_+^{\beta_2}, \forall i \in I_x,$$

where $$\sigma_{n_{x_i}}^2$$

represents the variance of the noise on the $x_n$ component in the block $B_{x_i}$, $g_{k,l}$ represents a time-frequency wavelet function, the operator 0+ represents the maximum between zero and the value to which the operator is applied, k, l∈Time×Frequency, $\beta_1 \geq 0$, $\beta_2 \geq 0$ and λ is a threshold for separating noise and signal coefficients.

7. The method of claim 1 wherein applying the multicomponent filter operator derives the filtered signal as:

$$\hat{x}_{BT3C}[m] = \frac{1}{A}\sum_{k,l} a_{3C}[k, l]\langle x_n, g_{k,l}\rangle g_{k,l}[m],$$

$$m = 1, 2, \ldots, N_{samples}$$

-continued $$\hat{y}_{BT3C}[m] = \frac{1}{A}\sum_{k,l} a_{3C}[k,l]\langle y_n, g_{k,l}\rangle g_{k,l}[m],$$

$$m = 1, 2, \ldots, N_{samples}$$

$$\hat{z}_{BT3C}[m] = \frac{1}{A}\sum_{k,l} a_{3C}[k,l]\langle z_n, g_{k,l}\rangle g_{k,l}[m],$$

$$m = 1, 2, \ldots, N_{samples}$$

where $a_{3C}[k,l]$ is the operator that is convolved with the data, $g_{k,l}$ represents a time-frequency wavelet function and A is a user-controlled parameter greater than or equal to 1 and $N_{samples}$ is the number of time samples in the microseismic data.

8. The method of claim 1, further comprising:
applying a polarization filter to the received microseismic data prior to convolving said data.

9. The method of claim 1, further comprising:
using the filtered microseismic data to generate a Wiener filter.

10. The method of claim 1, further comprising
processing the filtered microseismic data to determine a location of a microseismic event that generated, at least in part, the microseismic data.

11. A method for processing microseismic data, comprising:
receiving the microseismic data having three components, wherein the microseismic data are acquired by a plurality of multicomponent sensors and recorded by a receiver network;
convolving the microseismic data with a multicomponent filter operator that is applied to all three components of the microseismic data, wherein the signal-to-noise ratio in the microseismic data is enhanced by applying the multicomponent filter operator to the microseismic data;
enhancing signal-to-noise ratio in the microseismic data by applying a multicomponent filter operator to the convolved microseismic data; and
processing the filtered microseismic data to determine at least one of a location of one or more microseism that generated, at least in part, the microseismic data and properties of a subterranean section of the Earth.

12. The method of claim 11, further comprising:
applying a polarization filter to the received microseismic data.

13. The method of claim 11, further comprising:
using the filtered microseismic data to generate a Wiener filter.

14. The method of claim 11, wherein the multicomponent filter operator comprises an adaptive block-thresholding (BT) algorithm that is applied to the three components of the microseismic data.

15. The method of claim 11, wherein the multicomponent filter operator is applied in the time frequency domain.

16. The method of claim 14, wherein the threshold for the adaptive block-thresholding (BT) algorithm is determined using a noise variance.

17. The method of claim 11, wherein the multicomponent filter is designed using $\alpha_x$, $\alpha_y$, and $\alpha_z$ attenuation maps.

* * * * *